(12) United States Patent
Shimizu et al.

(10) Patent No.: US 8,302,237 B2
(45) Date of Patent: Nov. 6, 2012

(54) BOARDING BRIDGE

(75) Inventors: Yasuaki Shimizu, Hiroshima (JP); Kenji Iwamoto, Hiroshima (JP); Akira Takarada, Hiroshima (JP); Kazunori Yamane, Hiroshima (JP)

(73) Assignee: Mitsubishi Heavy Industries Transportation Equipment Engineering & Service Co., Ltd., Kanagawa (JP)

( * ) Notice: Subject to any disclaimer, the term of this patent is extended or adjusted under 35 U.S.C. 154(b) by 203 days.

(21) Appl. No.: 12/865,699

(22) PCT Filed: Jan. 21, 2009

(86) PCT No.: PCT/JP2009/050850
§ 371 (c)(1),
(2), (4) Date: Jul. 30, 2010

(87) PCT Pub. No.: WO2009/096285
PCT Pub. Date: Aug. 6, 2009

(65) Prior Publication Data
US 2011/0000029 A1 Jan. 6, 2011

(30) Foreign Application Priority Data
Jan. 31, 2008 (JP) .................... 2008-021041

(51) Int. Cl.
*E01D 15/00* (2006.01)
(52) U.S. Cl. .......................... 14/71.5; 14/69.5
(58) Field of Classification Search ........... 14/69.5–72.5
See application file for complete search history.

(56) References Cited

FOREIGN PATENT DOCUMENTS

| DE | 3532657 A | 3/1987 |
|---|---|---|
| JP | 2-71098 U | 5/1990 |
| JP | 2004-90770 A | 3/2004 |
| JP | 2007-196958 A | 8/2007 |

OTHER PUBLICATIONS

International Search Report dated Feb. 24, 2009 from PCT Application No. PCT/JP2009/050850 filed Jan. 21, 2009 (2 pages).

*Primary Examiner* — Raymond W Addie
(74) *Attorney, Agent, or Firm* — Workman Nydegger (57) ABSTRACT

A boarding bridge is provided that has an inexpensive, trouble-free, and strong construction, that eliminates the level differences between the passage portions of adjacent passage sections, and can reduce the occurrence of passengers falling and the like. In the boarding bridge (1), a proximal end tunnel (7) and a distal end tunnel (9) are telescopically fit, and are extended and retracted by moving relative to each other in a longitudinal direction. At the passage portion of the distal end tunnel (9) are provided a passage member (33) having, at a passage portion of the distal end tunnel (9), one end thereof connected to the end portion of the stationary passage (29) of the proximal end tunnel (7), having a distal end passage portion (31) that has at least a predetermined length in a longitudinal direction, and having the other end thereof installed at the proximal end tunnel (7); sprockets (35) that are installed at the lower portion of the distal end tunnel of the distal end tunnel (9) such that the position thereof does not move, and that guide the passage member (33) in a vertical direction; a sheave (37) that is installed at the lower portion of the back end portion of the distal end tunnel (9) such that the position thereof does not move, and that guides the passage member (33) in a vertical direction; and a spring member (39) that applies a tension to the passage member (33).

11 Claims, 5 Drawing Sheets

BOARDING BRIDGE

BACKGROUND OF THE INVENTION

1. Field of the Invention

The present invention relates to a boarding bridge that is used by passengers to board and deboard an aircraft or ship or the like.

2. Description of Related Art

A boarding bridge may be a tunnel-shaped walkway passage that links, for example, a terminal building of an airport and an aircraft, and enables direct boarding and deboarding of passengers between the terminal building and the aircraft.

The intermediate passage portions of the boarding bridge are constructed of plural passage sections that are telescopically fit, and the boarding bridge is extended and retracted by these passage sections moving relative to each other in a longitudinal direction. Thus, the distance between the terminal building and the aircraft can be accommodated.

However, because the passage sections are telescopically fit, there are level differences in the passages of adjacent passage sections, and there is a concern that passengers may trip and fall on these level differences.

As a device for eliminating these level differences, as disclosed, for example, in Japanese Unexamined Patent Application, First Publication No. 2004-90770, a device is used that bridges the steps between the passages of adjacent passage sections.

However, the device that bridges the steps as disclosed in Japanese Unexamined Patent Application, First Publication No. 2004-80770, does not eliminate the steps in a fundamental manner, and thus there remains, as before, the concern that a passenger may trip and fall at the portion of the step.

In addition, there is the problem that for a passenger in a wheel chair, passing through the boarding bridge may be difficult.

In particular, in view of the development of recent barrier free structures, a passage that eliminates the level differences is even more necessary.

Furthermore, an inexpensive, trouble-free, and strong structure is required.

In consideration of the above problems, it is an object of the present invention to provide a boarding bridge that has an inexpensive, trouble-free, and strong structure, eliminates the level differences between the passage portions of adjacent passage sections, and enables a reduction in the occurrence of falling and the like.

BRIEF SUMMARY OF THE INVENTION

In order to solve the problems described above, the present invention employs the following solutions.

Specifically, one aspect of the present invention is a boarding bridge in which plural tubular passage sections are telescopically fit and extend and retract by moving relatively to each other in a longitudinal direction, wherein the boarding bridge is provided with, at a passage portion of an outer passage section, among the passage portions that are positioned at both inside or outside adjacent passage sections: a passage member in which one end thereof is connected to the end portion of the passage portion of the inner passage section that is positioned inside, that includes a walkway passage portion having at least a predetermined length in the longitudinal direction, and the other end thereof is installed at the inner passage section; first guiding members that are installed at the lower portion of the distal end of the outer passage section such that the position thereof does not move, and guide the passage member in a vertical direction; a second guiding member that is installed at the lower portion of the back end portion of the outer passage section such that the position thereof does not move, and guides the passage member in a vertical direction; and a spring member that applies a tension to the passage member.

According to the boarding bridge of this aspect, the passage member of the outer passage section that is positioned at the outside includes one end that is connected to the end portion of the passage portion of the inner passage section that is positioned inside, extends toward the distal end side, and is guided downward by the first guiding members that are installed at a lower portion of the distal end tunnel of the outer passage section. In addition, the passage member faces the back end side of the outer passage section, is guided upward by the second guiding member that is installed at a lower portion of the back end portion of the outer passage section, and the other end thereof is installed on the inner passage section.

In this manner, in the passage member, both ends in the longitudinal direction are attached to the inner passage section, whereas in contrast, the first guiding members and the second guiding member are installed at the outer passage section such that their positions do not move. Thus, in the case in which the outer passage section and the inner passage section move relatively in the longitudinal direction, the distance from one end to the first guiding members and the distance from the other end to the second guiding member inversely changes by an amount equivalent to this movement, that is, if one side lengthens then other side shortens.

The passage member includes a walkway passage portion with at least a predetermined length in the longitudinal direction from one end side, that is, a length from one end to the first guiding members when the outer passage section has moved the maximum distance toward the distal end side. Thus, when the outer passage section and the inner passage section move relatively in the longitudinal direction, it is possible to form a walkway passage portion that has a length that is equivalent to the amount of this movement. In addition, because a tension is applied to the passage member by the spring member, it is possible to form a stable walkway passage.

One end of this walkway passage is connected to the end portion of the passage portion of the inner passage section that is positioned inside, and thus, the passage of the inner passage section and the outer passage section can be formed so as to be continuous. It is possible thereby to reduce the occurrence of situations in which passengers trip or fall or the like. In addition, the passengers can pass safely without worrying about tripping or falling.

In this situation, preferably, the height position of the first guiding members is set such that the height position of the walkway passage portion is substantially identical to that of the passage portion of the inner passage section.

In this case, for example, if the stationary passage portions that are provided at the innermost passage section, which is connected to the terminal, and the outermost passage section that is connected to the terminal and the head that is disposed at the distal end portion of the outermost passage section, and, for example, carries out the connection to the aircraft, have substantially identical heights, it is possible to construct the entire passage portion of the boarding bridge at a substantially constant height.

In addition, both end portions of the passage member are installed at the inner passage section, and simply by forming the passage members so as to be guided by the first guiding portions and the second guiding portion, the necessary walkway passage portion is automatically formed accompanying the movement of the outer passage section. Thus, a construction that, for example, makes control elements unnecessary, can be simply and inexpensively manufactured, and the construction is difficult to damage and is strong.

In addition, in the aspect described above, advantageously, the positions of the first guiding portions and the second guiding portion are fixed such that the axial direction thereof is along a transverse direction and they thereby form a rotating body that is installed so as to rotate freely, and the passage member wraps around this rotating body.

In this a manner, in the case in which the outer passage section and the inner passage section move relatively in a longitudinal direction, it is possible to make the movement of the passage member in the first guiding portions and the second guiding portion smooth.

In addition, in the aspect described above, the walkway passage portion may be formed by partitioned walkway passage portions that are partitioned into plural portions in the longitudinal direction.

Thereby, the movement between the passage position and the passage outer position at a position changing portion can be carried out due to the bending or separation between the partitioned passage portions, and thus, the partitioned passage portions can be structured of a strong material having a high rigidity, and they can be thereby made into a stable passage portion.

In addition, in the aspect described above, the passage member may be positioned below the outer passage section between the first guiding portions and the second guiding portion, and the spring member may be positioned between the first guiding portions and the second guiding portion.

In this manner, the spring member can be relatively easily accessed, and thus maintenance can be easily carried out.

In addition, in the aspect described above, advantageously, an adjustment member that adjusts the length of the passage member in the longitudinal direction is provided.

The length of the passage member changes in accordance with use. For example, if a rope is being used, this rope may stretch from its original length. In this case, the length of the passage member can be adjusted by the adjusting member.

Thereby, the tension that is applied to the passage member by the spring member can be maintained substantially constant, and a stable walkway passage portion can be formed.

According to the present invention, a passage member is one in which both ends in a longitudinal direction are installed at the inner passage section, whereas the first guiding members and the second guiding member are installed at the outer passage section such that their positions do not move. Thus, it is possible to reduce the occurrence of situations in which the passengers trip or fall. In addition, passengers can pass safely without worrying about tripping or falling.

In addition, the structure can be simply and inexpensively manufactured, and the structure is difficult to damage and is strong.

BRIEF EXPLANATION OF THE REFERENCE SYMBOLS 1 boarding bridge
7 proximal end tunnel
9 distal end tunnel
29 stationary passage
31 distal end passage portion
33 passage member
35 sprocket
37 sheave
39 spring member
41 turnbuckle portion
49 variable length passage portion
55 step
N longitudinal direction

DETAILED DESCRIPTION OF THE INVENTION

Below, the embodiments of the present invention will be explained with reference to FIG. 1 to FIG. 7, which are examples of a boarding bridge 1 in which a tunnel portion that extends and retracts is formed by two tunnels.

Figure 1:
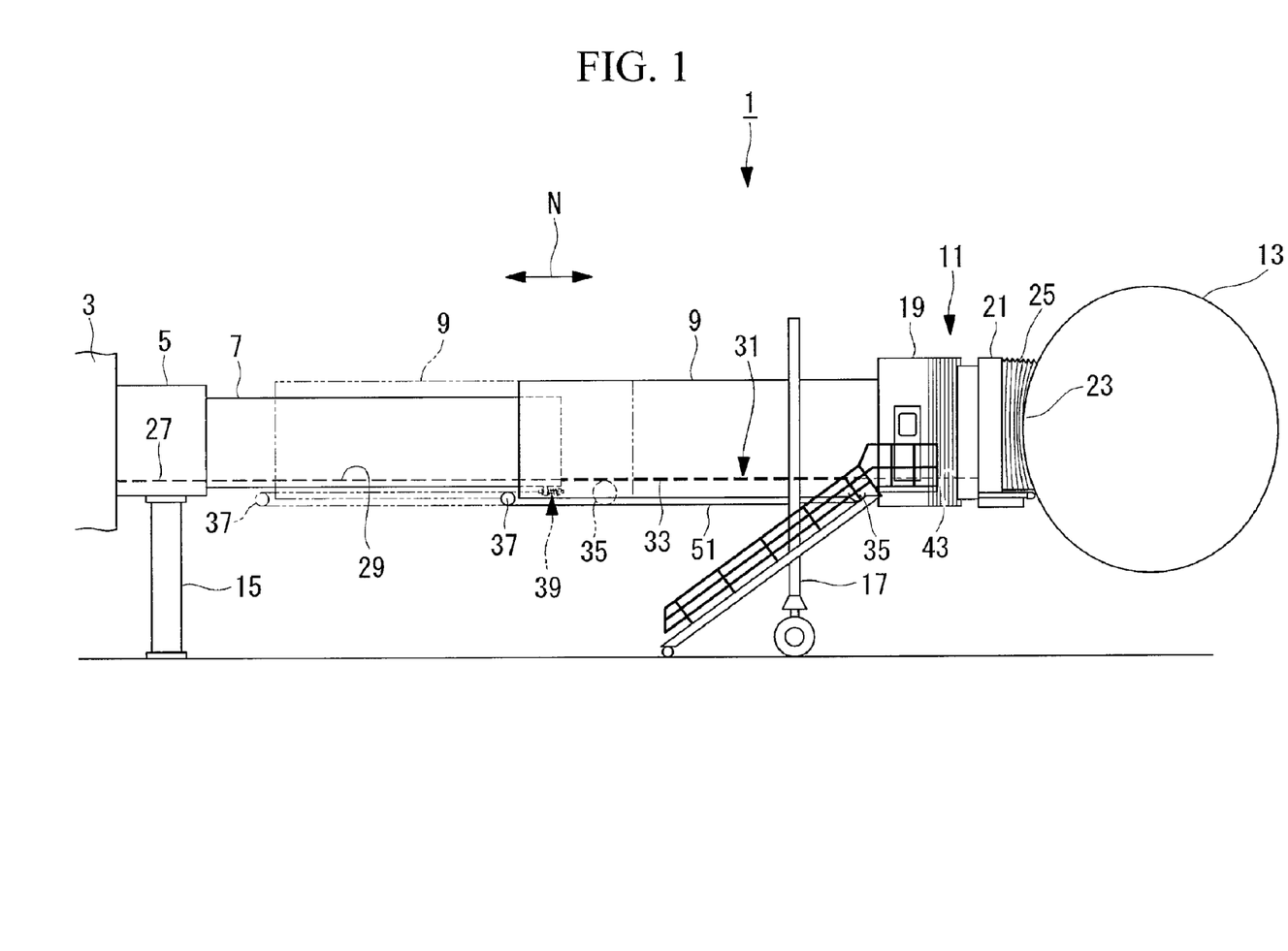
FIG. 1 is a frontal view that shows the overall schematic structure of the boarding bridge according to an embodiment of the present invention.

FIG. 1 is a frontal view that shows the overall schematic structure of the boarding bridge 1.

The boarding bridge 1 links an airport terminal building and an aircraft 13, and forms a walkway for passengers between the terminal building and the aircraft 13. The boarding bridge 1 enables direct boarding and deboarding.

The boarding bridge 1 is provided with a rotunda 5 that is provided so as to be fixed to a stationary bridge 3 that passes to the terminal building; a proximal end tunnel (passage section, inner passage section) 7 that is connected to the rotunda so as to be rotatable in a horizontal direction; a distal end tunnel (passage section, outer passage section) 9 that telescopically fits over the distal end side (the aircraft 13 side) of the proximal end tunnel 7; and a head 11 that is provided at the distal end portion of the distal end tunnel 9.

A stationary leg 15, which is disposed so as to be fixed to the ground, is provided under the rotunda 5. A movable leg 17 is provided at the distal end side of the distal end tunnel 9, where the distal end side is in the longitudinal direction.

The boarding bridge 1 is supported by the stationary leg 15 and the movable leg 17.

The proximal end tunnel 7 and the distal end tunnel 9 are each shaped as hollow rectangular column. In the proximal end tunnel 7 and the distal end tunnel 9, steel structural beams are disposed at each of the sides of the rectangular column, and, for example, aluminum alloy panels are installed so as to link the structural beams at both side surfaces and the upper and lower surfaces to form a tubular shape. The panels may be formed, for example, of steel, resin, or a transparent material (resin, glass, or the like).

The cross-sectional area of the hollow portion of the distal end tunnel 9 is formed so as to be larger than the cross-sectional area of the proximal end tunnel 7. The hollow portion of the distal end tunnel 9 is formed so as to guide the outer peripheral surface of the distal end tunnel 7.

The distal end tunnel 9 moves in a longitudinal direction N as the movable leg 17 moves, and the length of the boarding bridge 1 is thereby increased and decreased. The distance between the rotunda 5 and the aircraft 13 is accommodated by this increase and decrease.

The head 11 includes the head body 19 that is installed at the distal end tunnel of the distal end tunnel 9 and a linking portion 21 that connects the head body 19 and a doorway portion 23 of the aircraft 13.

The head body 19 has a substantially tubular shape, the axis thereof extending vertically.

The linking portion 21 has a substantially rectangular shape. The linking portion 21 is installed so as to be able to move along the periphery of the head body 19 within a constant angular range.

A linking section 25, which is provided at the distal end portion of the linking portion 21, extends and retracts in a longitudinal direction N due to having a bellow structure, covers the periphery of the doorway portion 23, and is in close contact with the skin of the aircraft 13.

A stationary passage 27 along which the passengers pass is provided in the rotunda 5. A stationary passage (the passage portion of the inner passage section) 29 along which the passengers pass is provided over substantially the entire length of the proximal end tunnel 7.

A distal end passage portion (passage portion of the outer passage section) 31 is provided in the distal end tunnel 9.

A passage member 33, sprockets (first guiding portions, rotating body) 35, sheaves (second guiding portions, rotating body) 37, a spring member 39, and a turnbuckle portion (adjustment member) 41 are provided at the distal end passage portion 31.

A stationary passage 43, on which the passengers pass, is provided at the head 11. An opening-closing step 45, which forms a passage that is connected to the distal end passage portion 31, is provided at the back end (stationary bridge 3 side) of the stationary passage 43.

The opening-closing step 45 is structured so as to be pivoted by a hydraulic cylinder 47, which is installed in the head 11, at the stationary passage 43 side in a vertical direction centered on an axis that extends in the transverse direction, and the back end side thereof selectively contacts the distal end passage portion 31.

The distal end passage portion 31 will be explained with reference to FIG. 2 to FIG. 7.

Figure 2:
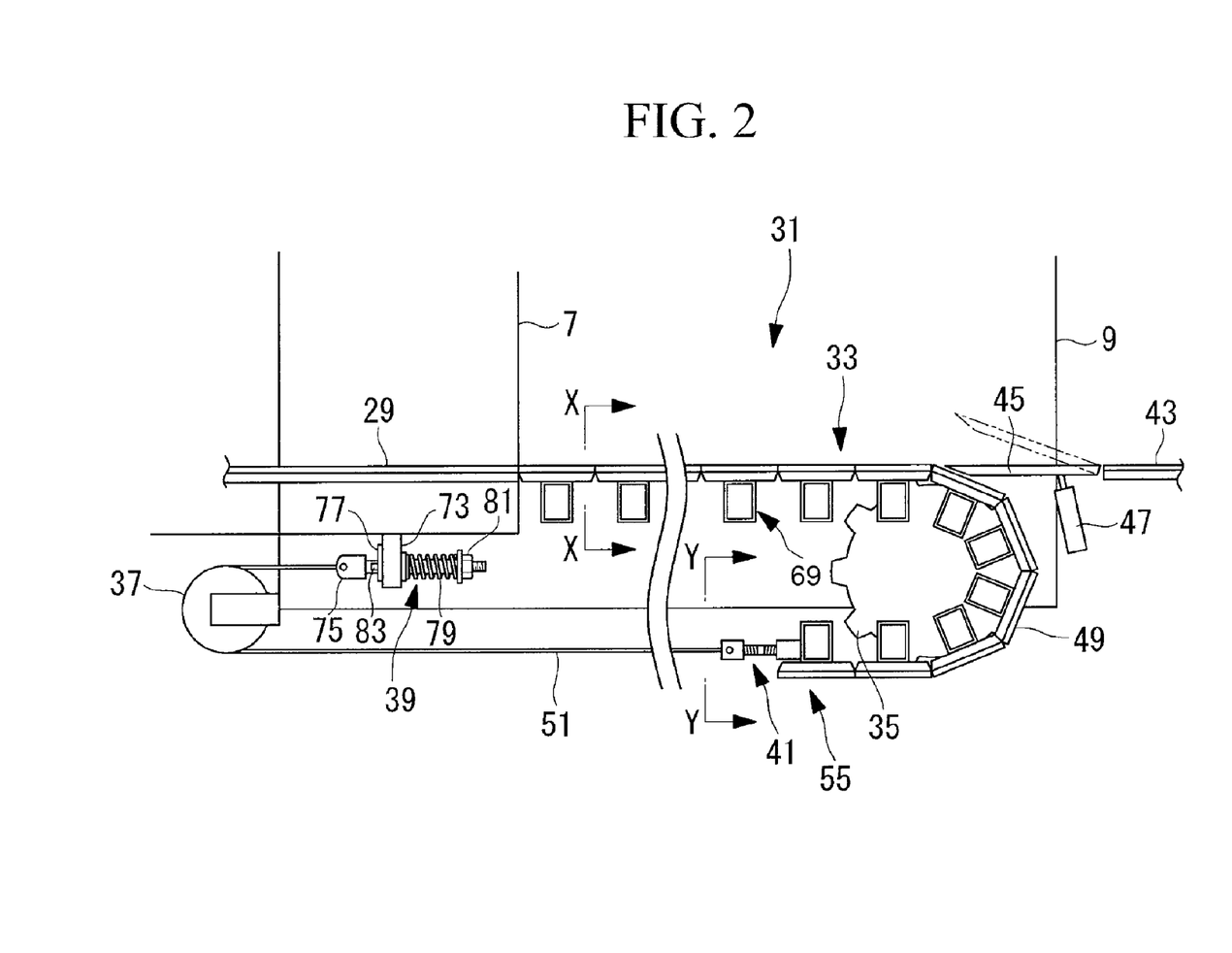
FIG. 2 is a partial longitudinal sectional view of the distal end passage portion according to an embodiment of the present invention.
Figure 3:
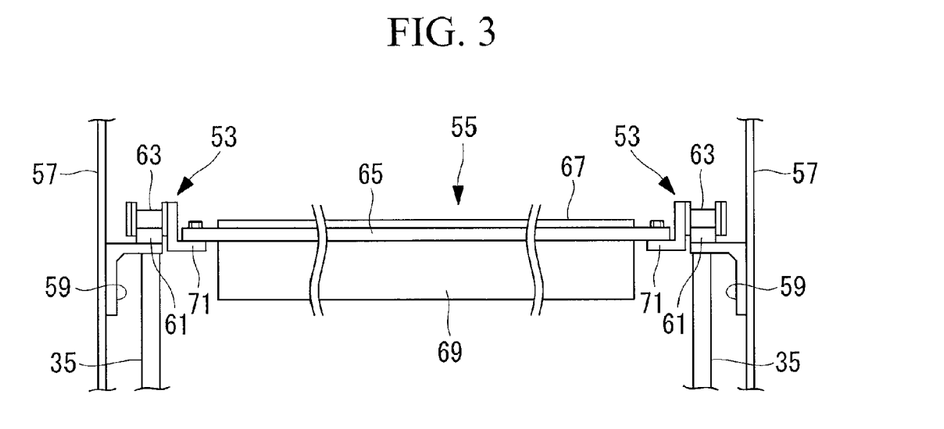
FIG. 3 is a sectional view along the line X-X in FIG. 2.
Figure 4:
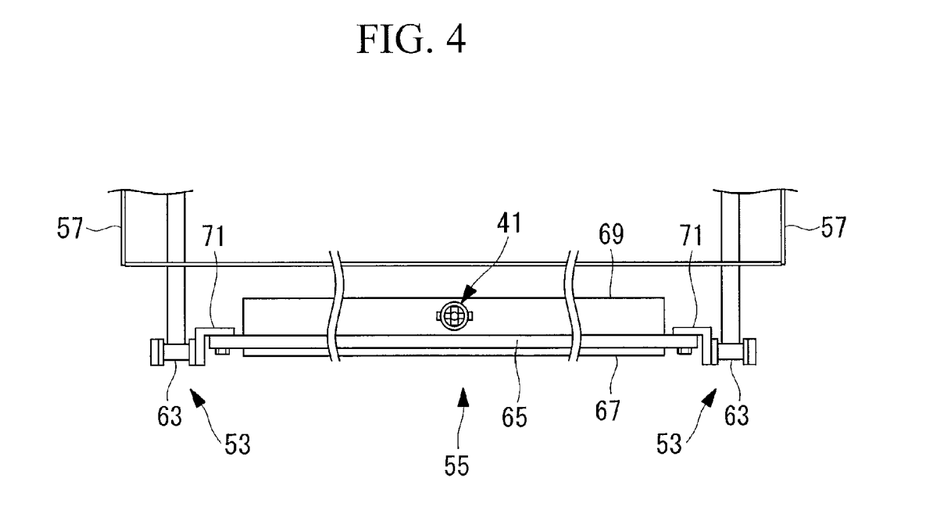
FIG. 4 is a sectional view along the line Y-Y in FIG. 2.
Figure 5:
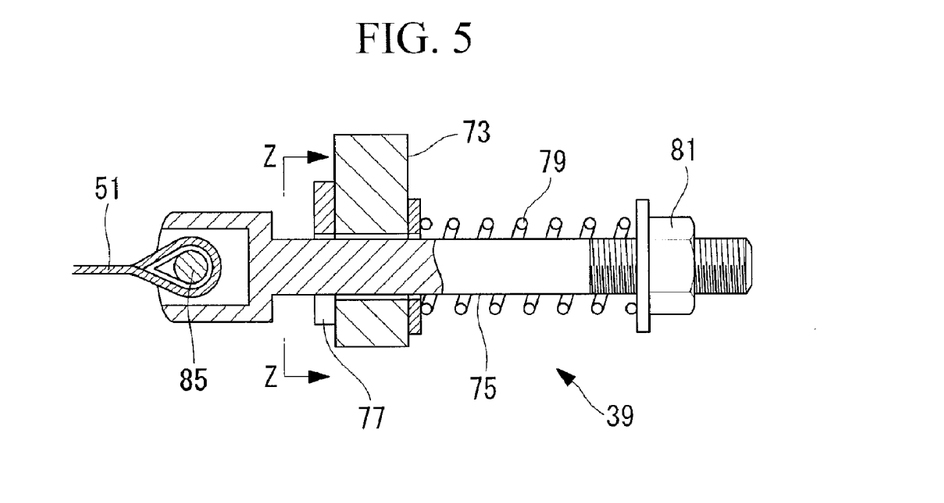
FIG. 5 is a longitudinal sectional view of the spring member according to an embodiment of the present invention.
Figure 6:
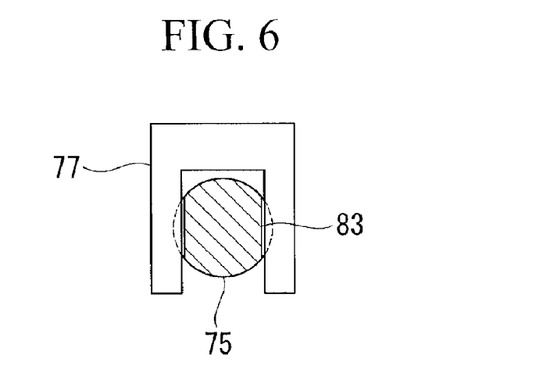
FIG. 6 is a sectional view along the line Z-Z in FIG. 5.
Figure 7:
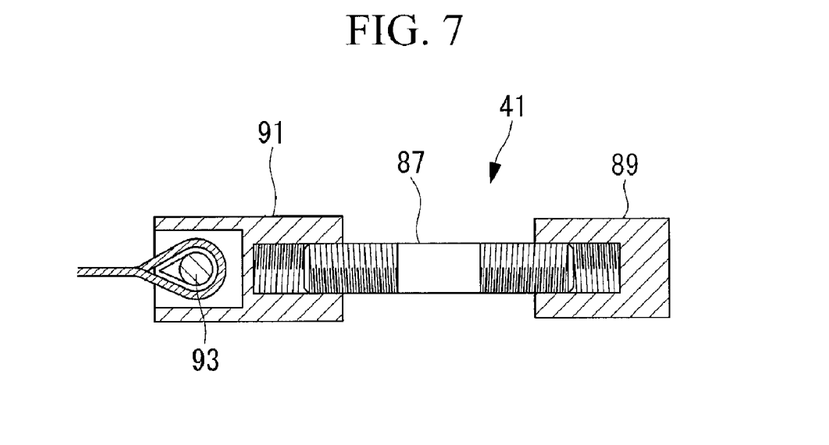
FIG. 7 is a longitudinal sectional view of the turnbuckle portion according to an embodiment of the present invention.

FIG. 2 is a partial longitudinal sectional view of the distal end passage portion 31. FIG. 3 is a sectional view along the line X-X in FIG. 2. FIG. 4 is a perspective view along the line Y-Y in FIG. 2. FIG. 5 is a longitudinal sectional view of the spring member 39. FIG. 6 is a sectional view along the line Z-Z in FIG. 5. FIG. 7 is a longitudinal sectional view of the turnbuckle portion 41.

The passage member 33A is provided with variable length passage portion (walkway passage portion) 49 that is positioned at the back end side and forms a passage along which the passengers pass, and a rope 51 that is connected to the distal end side of the variable length passage portion 49.

The variable length passage portion 49 is provided with a pair of chains 53, which are provided on both sides of the distal end tunnel 9, and plural steps (partitioned walkway passage portions) 55 that have both ends thereof fastened to the chains 53 and that form a walkway passage.

Inside the distal end tunnel 9, plural upper brackets 59 are installed at intervals at positions having substantially identical heights along the longitudinal direction N at the lower portion of the panels 57 on both sides. Each upper bracket 59 forms an L-shape in cross-section and is installed such that the upper portion thereof forms a horizontal surface.

The upper bracket 59 at the far end side is installed at a position in proximity to the proximal end tunnel 7 when the distal end tunnel 9 has been moved to the most distal end side. The upper bracket 59 at the most distal end side is installed in proximity to the distal end portion of the distal end tunnel 9.

Rod-shaped upper guides 61, having a substantially rectangular cross-section, are mounted across and fastened so as to be supported by the upper surface of each of the upper brackets 59.

The sprockets 35 are arranged on the distal end side of the upper guide 61.

Each sprocket 35 is disposed such that the axial center thereof is aligned in a transverse direction and is installed so as to be freely rotatable on the distal end tunnel 9.

The chains 53 are installed such that the end portions of the back end side (one end) are attached to the proximal end tunnel 7 and wraps around the sprockets 35. Roller portions 63 of the chains 53 are guided by the upper guides 61.

The length of the chains 53 is sufficient to wrap around the sprockets 35 even when the distal end tunnel 9 has moved to the most distal end side.

Each step 55 is formed by a main body portion 65 that is a plate having a substantially platform-shaped cross section, a carpet 67 that is affixed substantially over the entire surface of the large surface area side of the main body portion 65, and a reinforcing portion 69 that is fastened to the small surface area side of the main body portion 65 and that reinforces the strength of the main body portion 65.

The main body portion 65 is disposed such that the reinforcing portion 69 faces the inside of the path of the chains 53, and both end portions thereof are fastened to projecting portions 71 that project toward the inside of each of the chains 53.

The reinforcing portion 69 is a hollow rectangular body, and is arranged substantially over the entire length of the main body portion 65.

The main body portion 65 and the reinforcing portion 69 are made of an aluminum alloy.

Each step 55 is attached to the chains 53 such that there is substantially no gap between adjacent steps 55.

The heights of the positions of each of the upper guides 61 are set such that the upper surface position of the carpet 67 on the step 55, which is installed on the chains 53 that guide them, is substantially the same height as the upper surface portion of the stationary passage 29. Specifically, the upper guides 61 and the steps 55 that are supported on the upper portion position of the sprockets 35, which follow the upper guides 61, form the walkway passage. In addition, a step 55 that is more toward the distal end side than a given step 55 is wrapped around the sprockets 35 and is positioned therebelow.

The sheave 37 is freely rotatably installed at a substantially central position of the distal end tunnel 9 in the transverse direction at the back end lower portion such that the position thereof does not move.

The spring member 39 is installed by being fastened at a substantially central position in the transverse direction of the distal end lower portion surface of the proximal end tunnel 7.

As shown in FIG. 2 and FIG. 4, one end of each rope 51 is installed via the turnbuckle portion 41 at a substantially central position, in the transverse direction, of the reinforcing portion 69 of the step 55 at the most distal end side. The other end of each rope 51 is wrapped around the sheave 37 and is installed at the spring member 39.

The spring member 39 is provided with a supporting portion 73 that is attached to the proximal end tunnel 7, an installation rod body 75 at which the ropes 51 are installed, a rotation stopper 77 that prevents the rotation of the installation rod body 75, a compressed spring 79, and a nut 81.

The installation rod body 75 has a substantially cylindrical shape, in one end thereof a head portion that receives an end portion of the rope 51 is cut, and in the other end thereof an external thread that meshes with the nut 81 is cut.

Each rope 51 that has been inserted into the head portion of the installation rod body 75 is held in the head portion by the pin 85, which has restricted movement at the head portion.

The installation rod body 75 is inserted into a through hole that is provided in the supporting portion 73 and a compressed spring 79. The compressed spring 79 is held in place by the supporting portion 73 and the nut 81.

Opposing flattened portions 83 (refer to FIG. 2 and FIG. 6) are provided at portions of the shaft portion of the installation rod body 75. An open portion of the rotation stopper 77, which has a square-bracket shape, is mounted so as to surround the flattened portions 83. The rotation stopper 77 is fixed by the holding portion 73, and prevents the installation rod body 75 from rotating around its axis.

The compressed spring 79 pulls the ropes 51, and thus the variable length passage portion 49 is pulled via the turnbuckle portion, that is, a tension is applied.

The amount of this tension is determined by the size of the compressed spring 79 and the position of the nut 81. Therefore, the size of the compressed spring 79 and the position of the nut 81 are set such that the steps 55 form a stable walkway passage.

As shown in FIG. 7, the turnbuckle portion 41 is provided with a screw rod 87 that has formed on each end thereof external threads having a different orientation, an installation portion 89 that is installed so as to mesh with one end side of the screw rod 87 and to be fixed to a step 55, and a supporting portion 91 that meshes with the other end side of the screw rod 87 and has a recess that receives the rope 51.

Each rope 51 that has been inserted into the recess of the supporting portion 91 is held in the supporting portion 91 by a pin 93, the movement of which is restricted.

When the screw rod 87 is rotated, the installation portion 89 and the holding portion 91 approach or depart from each other. Thereby, the length of the passage member 33 can be adjusted.

Below, the operation of the boarding bridge 1 will be explained according to the above-described present embodiment.

The boarding bridge is in a standby state when most of the distal end tunnel 9 is fit over the proximal end gate 7, as shown by the two-dot chain line in FIG. 1, that is, when the length is reduced.

At this time, the turnbuckle portion 41 is positioned close to the sheave 37, and thus a large portion of the variable length passage portion 49 is positioned below the distal end tunnel 9.

When the aircraft 13 arrives at a predetermined position, the movable leg 17 is operated, and the distal end tunnel 9 moves toward the aircraft 13. That is, the boarding bridge 1 is extended.

When the distal end tunnel 9 moves toward the aircraft 13, the sprockets 35 and the sheave 37, which are attached at the distal end tunnel 9 such that their positions do not move, also move in the same direction by the same distance.

The force that is applied to one end side of the chains 53 that are attached to the proximal end tunnel 7 rotates the sprockets 35 and the sheave 37 in a counterclockwise direction in FIG. 2, and thus the chains 53 of the variable length passage portion 49 move in sequence from bottom to the top.

Accompanying the movement of the chains 53, the steps 55 of the variable length portion 49 become disposed at the passage position.

In addition, because the longitudinal length of the steps 55 is shortened, the steps that are adjacent to the portion of the sprockets 35 can bend with respect to each other. Thereby, accompanying the rotation of the sprockets 35, the steps 55 can move easily around the sprockets 35, and thus the steps 55 can be formed by material that has a high degree of rigidity, that is, for example, an aluminum alloy, and it is possible to form thereby a stable and strong variable length passage portion 49.

When the distal end tunnel 9 moves to the distal end side, the distance from one end (the end portion of the distal end side of the stationary passage 29) of the variable length passage portion 49 to the sprockets 35, or in other words, the length of the walkway passage, is increased by the amount of the movement of the distal end tunnel 9. In contrast, the distance from the sheave 37 to the spring member 39 is shortened by the amount of the movement of the distal end tunnel 9.

In this manner, the portion that serves as the walkway passage of the variable length passage portion 49 is automatically lengthened by the distance that the distal end tunnel 9 has moved.

In addition, because of the tension that is applied to the variable length passage portion 49 by the spring member 39, it is possible to form a stable walkway passage.

At this time, the opening-closing step 45 is retracted by the hydraulic cylinder 47 to the position that is shown by the two-dot chain line in FIG. 2 so as not to cause damage the rug 59 of the moving step 55 by scraping.

Then, when the head 11 is connected to the aircraft 13, the opening-closing step 45 is lowered, and a passage is formed in which the variable length portion 49 and the stationary passage 43 are continuous.

A continuous walkway passage positioned so as to have a substantially identical height is thereby formed from the rotunda 5 to the head 11, and thus, it is possible to reduce situations in which passengers may trip or fall, and the passengers can pass safely without worrying about tripping or falling.

When the passengers have completed their passage, the head 11 is separated from the aircraft 13, and the distal end tunnel 9 is moved toward the rotunda 5 side. At this time, the opening-closing step 45 is retracted in a manner similar to that described above.

When the distal end tunnel 9 moves toward the rotunda 5, the force that is applied to the spring member 39 that is installed at the proximal end tunnel 7 rotates the sprockets 35 and the sheave 37 clockwise in FIG. 2, and thus the chains 53 of the variable length passage portion 49 move in sequence from above to below.

Accompanying the movement of these chains 53, the steps 55 of the variable length passage portion 49 become disposed in sequence at a lower position.

In this case, for example, even if there is a problem such as an electrical failure, both end portions of the distal end passage portion 31 are attached to the proximal end tunnel 7 and guided by the sprockets 35 and the sheave 37 that are attached to the position lock at the distal end tunnel 9. Thus, situations in which, for example, the rope 51 hangs down loosely, do not occur.

Therefore, for example, the boarding bridge 1 can be easily moved for repairs.

In addition, both ends of the distal end passage portion 31 are attached to the proximal end tunnel 7, and simply by the sprockets 35 and the sheave 37, which are attached to the position lock at the distal end tunnel 9, guiding the ends, the necessary walkway passage is automatically formed accompanying the movement of the distal end tunnel 9. Thus, a simple and inexpensive structure that, for example, does not require control elements, can be fabricated, and the structure is difficult to damage and strong.

Note that the present invention is not limited to the embodiment described above, and various modifications are possible within a range that does not depart from the gist of the invention.

For example, although each rope 51 is attached at one location at a substantially central position, in a transverse direction, of the steps 55, this is not so limited. For example, each rope 51 may be installed at two locations on both end portions. Alternatively, a suitable embodiment may be used in which the ropes are attached at three locations, i.e., the center portion and both end portions.

In this case, a bilaterally symmetrical arrangement is preferable in the sense that the movement will be smooth, but an asymmetrical arrangement may also be used.

In addition, in the present embodiment, the turnbuckle portion 41 is installed on a step 55 and the spring member 39 is installed on the proximal end tunnel 7, but this is not so limited.

Figure 8:
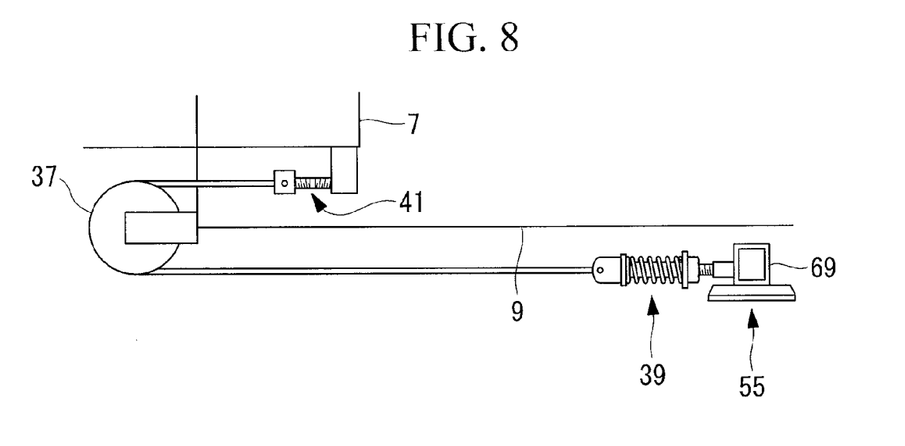
FIG. 8 is a partial longitudinal sectional view that shows an alternative embodiment of the rope portion according to an embodiment of the present invention.

For example, as shown in FIG. 8, the spring member 39 may be installed on a step 55, and the turnbuckle portion 41 may be installed on the proximal end tunnel 7.

Figure 9:
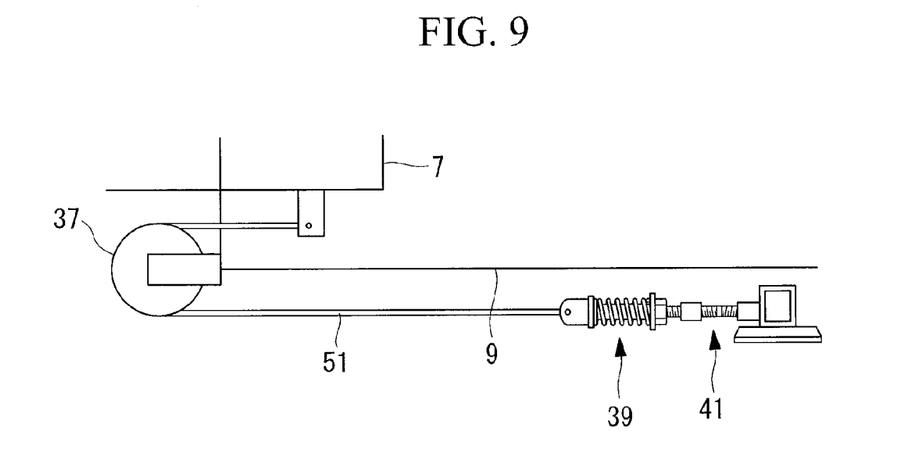
FIG. 9 is a partial longitudinal sectional view that shows another alternative embodiment of the rope portion according to an embodiment of the present invention.

In addition, as shown in FIG. 9, the turnbuckle portion 41 and the spring member 39 may be installed on a step 55.

In particular, when arranged as shown in FIG. 9, because the turnbuckle portion 41 and the spring member 39 are positioned outside of the distal end tunnel 9, the objects in the space between the proximal tunnel 7 and the distal end tunnel 9 can be relatively easily accessed, and maintenance can thereby be easily carried out.

In addition, in the present embodiment, each rope 51 is connected to the distal end side of the variable length passage portion 49, and the sheave 37 is used as a second guiding portion that guides the ropes 51. However, this is not so limited.

For example, chains may be used instead of the ropes 51. In this case, sprockets are used instead of the sheave 37.

Furthermore, in the present embodiment, the variable length passage portion 49 is formed by the steps 55 that are partitioned in the longitudinal direction. However, this is not so limited, and for example, a wide belt member may be used.

In addition, it is also possible to adapt this to the boarding bridge 1 in which an intermediate tunnel is provided between the proximal end tunnel 7 and the distal end tunnel 9.

Note that plural intermediate tunnels 10 may be provided.

What is claimed is:

1. A boarding bridge in which an inner passage section and an outer passage section, each of which is tubular, are telescopically fit, and extend and retract by moving relative to each other in a longitudinal direction, the boarding bridge comprising:

a passage member, one end of which is connected to an end portion of a passage portion of the inner passage section that comprises a walkway passage portion having at least a predetermined length in a longitudinal direction;

a first guiding member that is installed at the lower portion of a distal end portion of the outer passage section such that the position thereof does not move, and that guides the passage member in a vertical direction;

a second guiding member that is installed at a lower portion of the back end portion of the outer passage section such that the position thereof does not move, and that guides the passage member in the longitudinal direction; and a spring member that applies a tension to the passage member.

2. A boarding bridge according to claim 1, wherein each of the first guiding member and the second guiding member forms a rotating body having a position that is fixed such that the axial direction is along a transverse direction, and that is installed so as to rotate freely; and wherein the passage member wraps around the first guiding member.

3. A boarding bridge according to one of claim 1, wherein the walkway passage portion comprises partitioned walkway passage portions that are partitioned into plural portions in the longitudinal direction.

4. A boarding bridge according to claim 1, wherein the passage member is disposed below the outer passage section between the first guiding portions and the second guiding portion, and the spring member is disposed between the first guiding portions and the second guiding portion.

5. A boarding bridge according to claim 1, comprising an adjusting member that adjusts the length of the passage member in a longitudinal direction.

6. A boarding bridge according to claim 2, wherein the walkway passage portion comprises partitioned walkway passage portions that are partitioned into plural portions in the longitudinal direction.

7. A boarding bridge according to claim 2, wherein the passage member is disposed below the outer passage section between the first guiding portions and the second guiding portion, and the spring member is disposed between the first guiding portions and the second guiding portion.

8. A boarding bridge according to claim 3, wherein the passage member is disposed below the outer passage section between the first guiding portions and the second guiding portion, and the spring member is disposed between the first guiding portions and the second guiding portion.

9. A boarding bridge according to claim 2, comprising an adjusting member that adjusts the length of the passage member in a longitudinal direction.

10. A boarding bridge according to claim 3, comprising an adjusting member that adjusts the length of the passage member in a longitudinal direction.

11. A boarding bridge according to claim 4, comprising an adjusting member that adjusts the length of the passage member in a longitudinal direction.

* * * * *